United States Patent [19]

Loomis et al.

[11] 4,089,405

[45] May 16, 1978

[54] LEAD MAKING MACHINE HAVING IMPROVED FEEDING MEANS

[75] Inventors: Phillip Eugene Loomis, Harrisburg; James Woodrow Hammond, Camp Hill; Mervin Leonard Shughart, Carlisle, all of Pa.

[73] Assignee: AMP Incorporated, Harrisburg, Pa.

[21] Appl. No.: 723,697

[22] Filed: Sep. 16, 1976

[51] Int. Cl.$^{2}$ ........................ B65G 33/02; H01R 43/04

[52] U.S. Cl. ...................................... 198/475; 29/715; 29/753; 29/759; 198/548; 198/560; 198/657; 198/676

[58] Field of Search ................. 29/628, 630 R, 630 A, 29/714, 715, 748, 753, 759; 221/75, 277; 198/209, 213, 560, 548, 657, 676, 475

[56] References Cited

U.S. PATENT DOCUMENTS

| | | | |
|---|---|---|---|
| 3,245,135 | 4/1966 | Netta et al. | 29/630 A |

*Primary Examiner*—Carl E. Hall
*Attorney, Agent, or Firm*—Frederick W. Raring; William J. Keating; Jay L. Seitchik

[57] ABSTRACT

Apparatus for crimping terminals onto the ends of wires comprises a loading station at which the wires are serially loaded into a groove in a rotating drum. During rotation of the drum, the wires are moved laterally to a wire feeding station at which each wire is fed axially by the rotating drum, in cooperation with a pressure roller, to a crimping station at which a terminal is crimped onto the wire.

5 Claims, 14 Drawing Figures

2
4
6

24
20
26
40
30
28
55
228
234
154
20
6
8
6
16
6
22
36

Fig. 9
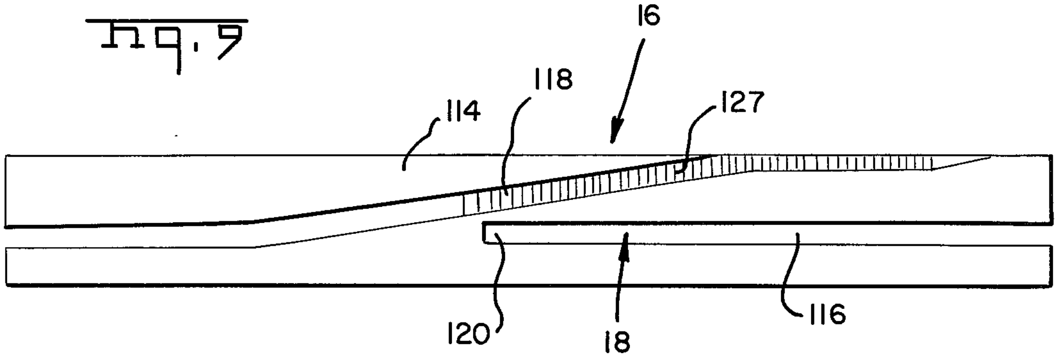
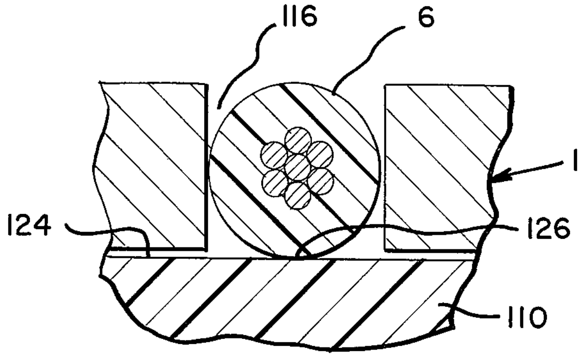
Fig. 10
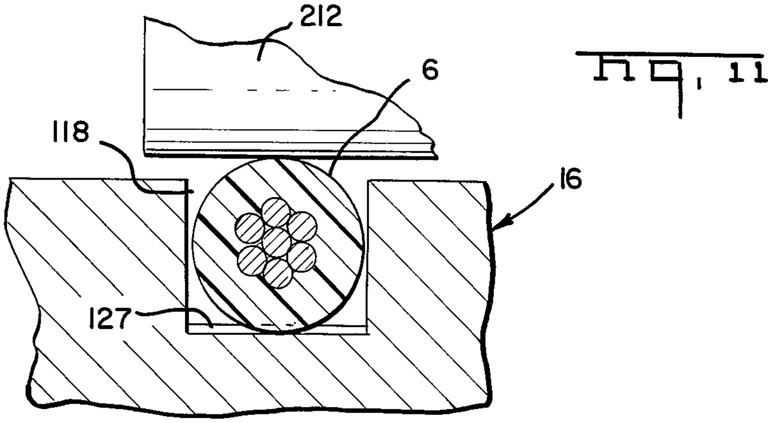
Fig. 11

LEAD MAKING MACHINE HAVING IMPROVED FEEDING MEANS

BACKGROUND OF THE INVENTION

This invention relates to semiautomatic apparatus for crimping terminals onto, or performing other operations on, the ends of wires. Semiautomatic crimping machines of the general class to which the invention appertains are shown, for example, in U.S. Pat. Nos. 3,804,603, and 3,456,324.

It is common practice in the electrical industry to crimp terminals onto the ends of individual wires by means of a relatively simple crimping apparatus which usually comprises a bench press having a terminal applicator therein. The applicator has a crimping anvil, to which the terminals in strip form are fed, and a crimping die which is movable during reciprocation of the press towards and away from the anvil. During operation of this type of apparatus, the operator simply locates the individual wires, one at a time, between the die and anvil and actuates the press to cause a terminal to be crimped into a properly located wire.

It has long been recognized that semiautomatic machines are preferable to the manual type of apparatus described above for several reasons. For example, a higher production rate can usually be obtained with a semiautomatic machine which carries out some of the functions usually carried out by the operator and the degree of skill required of the operator to operate a semiautomatic machine is reduced as compared with a manual type apparatus. Another significant advantage of semiautomatic machines of the type under consideration is that they are generally regarded as being safer to operate than manual machines since the operator need not place his hands near the moving parts of the machine. Semiautomatic machines of the type disclosed in the above identified U.S. Pat. Nos. 3,456,324, 3,804,603, and other issued U.S. patents have been used successfully in the electrical industry but previously known machines of this general type have had one or more comparative shortcomings which have retarded their widespread adoption.

In general, it has been recognized that a semiautomatic crimping apparatus having a more simple mechanical arrangement for wire handling than the arrangements of previously known machines would be desirable and would result in an increased useage of machines of this general class. The instant invention is directed to the achievement of an improved semiautomatic crimping machine having an extremely simple and reliable conveying and feeding arrangement. The invention is also directed generally to the achievement of other desiderata such as the ability to handle a range of wire sizes, improved means for precisely positioning the end of a feed wire, and a simplified mechanical system for handling wires being processed through the machine.

It is accordingly an object of the invention to provide an improved semiautomatic machine for performing operation on the end of a wire such as crimping a terminal onto the wire end. A further object is to provide an improved conveying and feeding arrangement for a semiautomatic terminal crimping apparatus. A further object is to provide a semiautomatic crimping machine having a wire conveying and feeding arrangement which is relatively simple in construction and which is capable of handling wires of varying diameters. A further object is to provide an apparatus which does not require a high degree of skill and a high level of training on the part of the operator. A further object is to provide an apparatus which is safe to operate in that it does not require that the operator's hands be close to the reciprocating parts of the machine.

These and other objects of the invention are achieved in a preferred embodiment thereof which is briefly described in the foregoing abstract, which is described in detail below, and which is shown in the accompanying drawing in which:

FIG. 9 is a view showing the developed surface of the wire conveying and feeding drum.

FIGS. 10 and 11 are fragmentary views illustrating the operation of the wire conveying and feeding drum.

Figures 1, 1A:
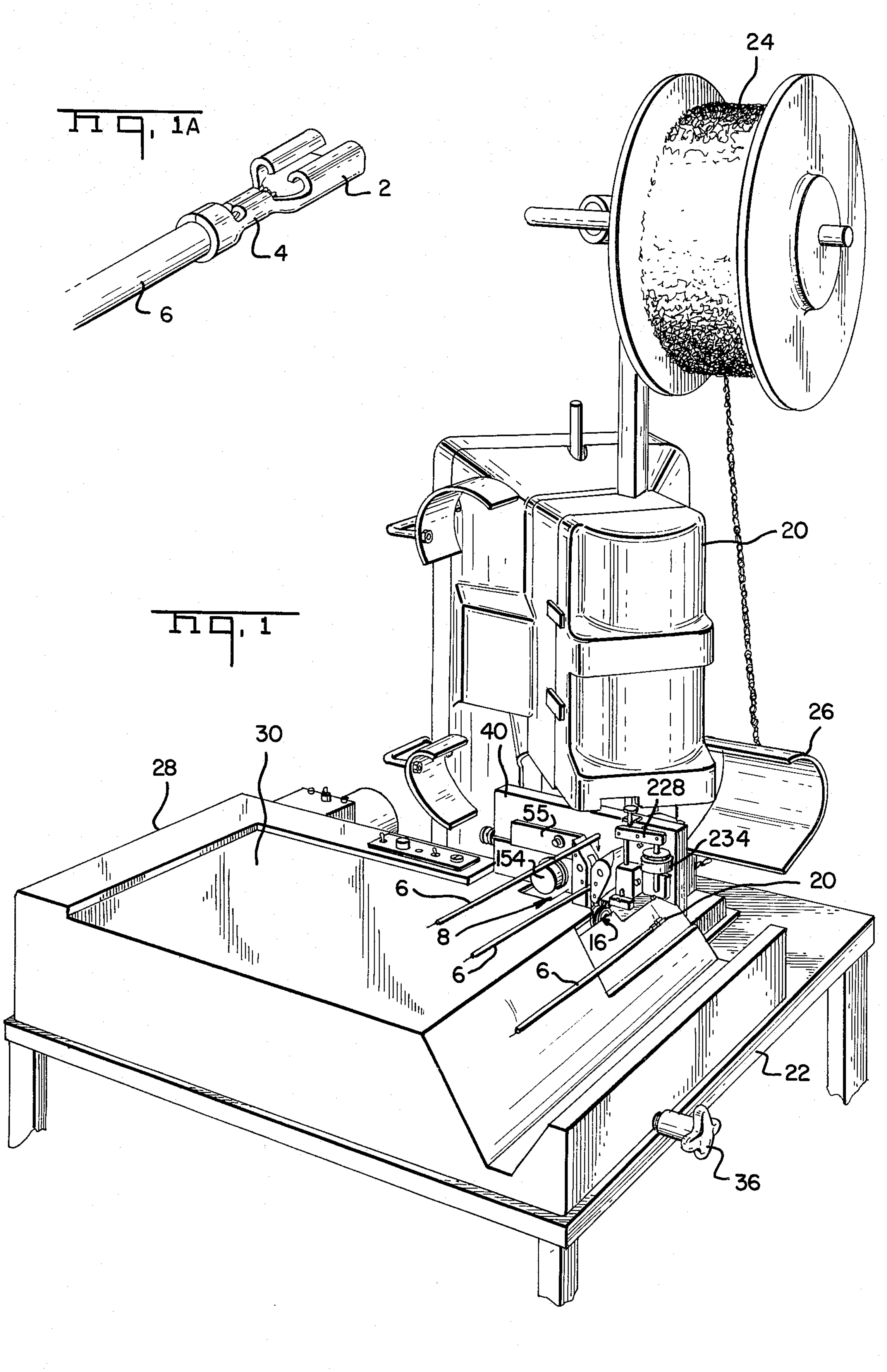
FIG. 1 is a perspective view of a preferred form of apparatus in accordance with the invention.
FIG. 1A is a perspective view of a terminated wire produced by the disclosed embodiment of the invention.

The herein disclosed embodiment of the invention is adapted to crimp a conventional terminal 2 onto the stripped end 4 of a wire 6. The wires may be of any desired length, relatively short wires being shown in the drawing in the interest of clarity and simplicity.

Figure 2:
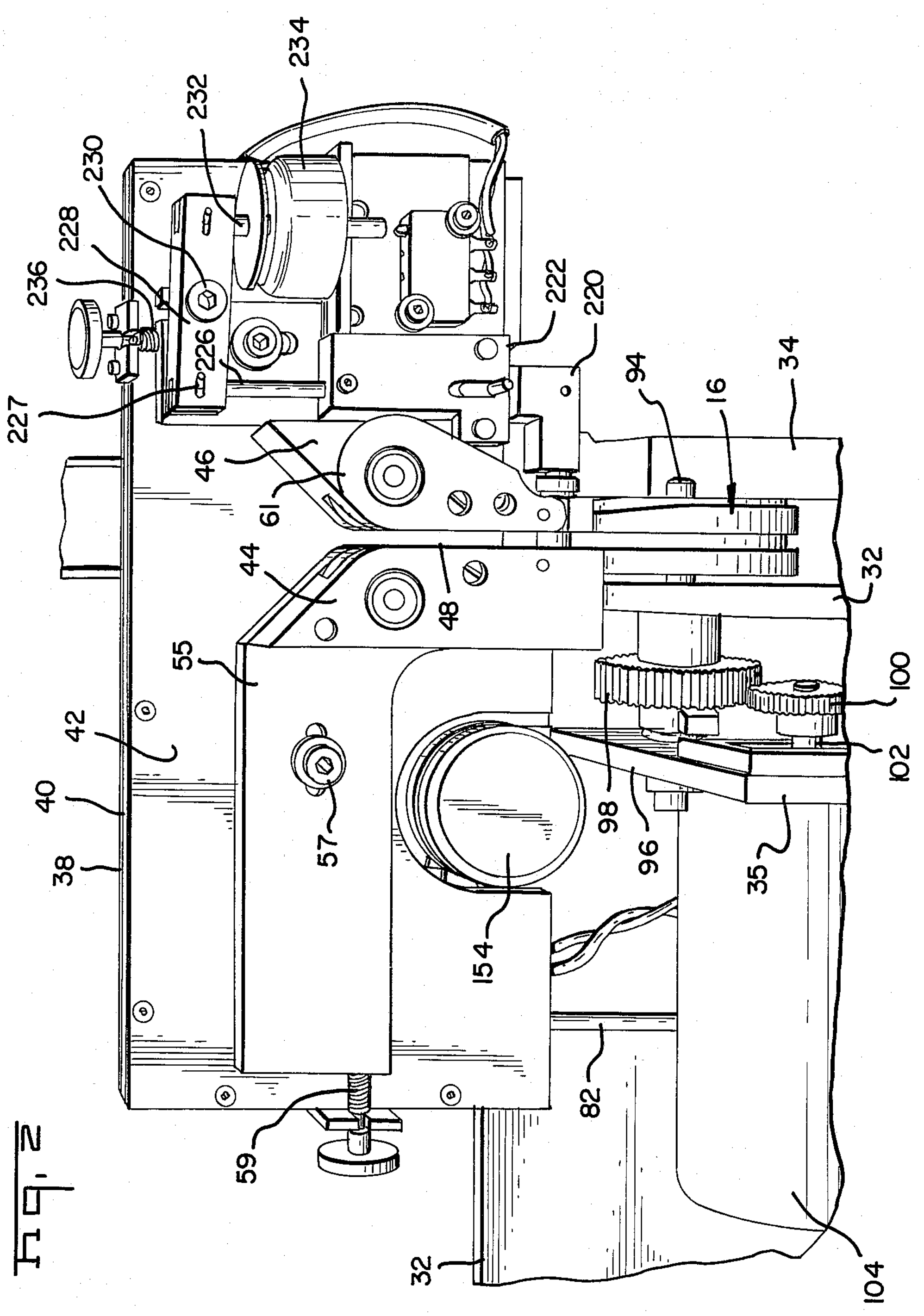
FIG. 2 is a fragmentary frontal view showing the wire loading station, the wire feeding station, the wire conveying and feeding drum, and related structural features.
Figure 3:
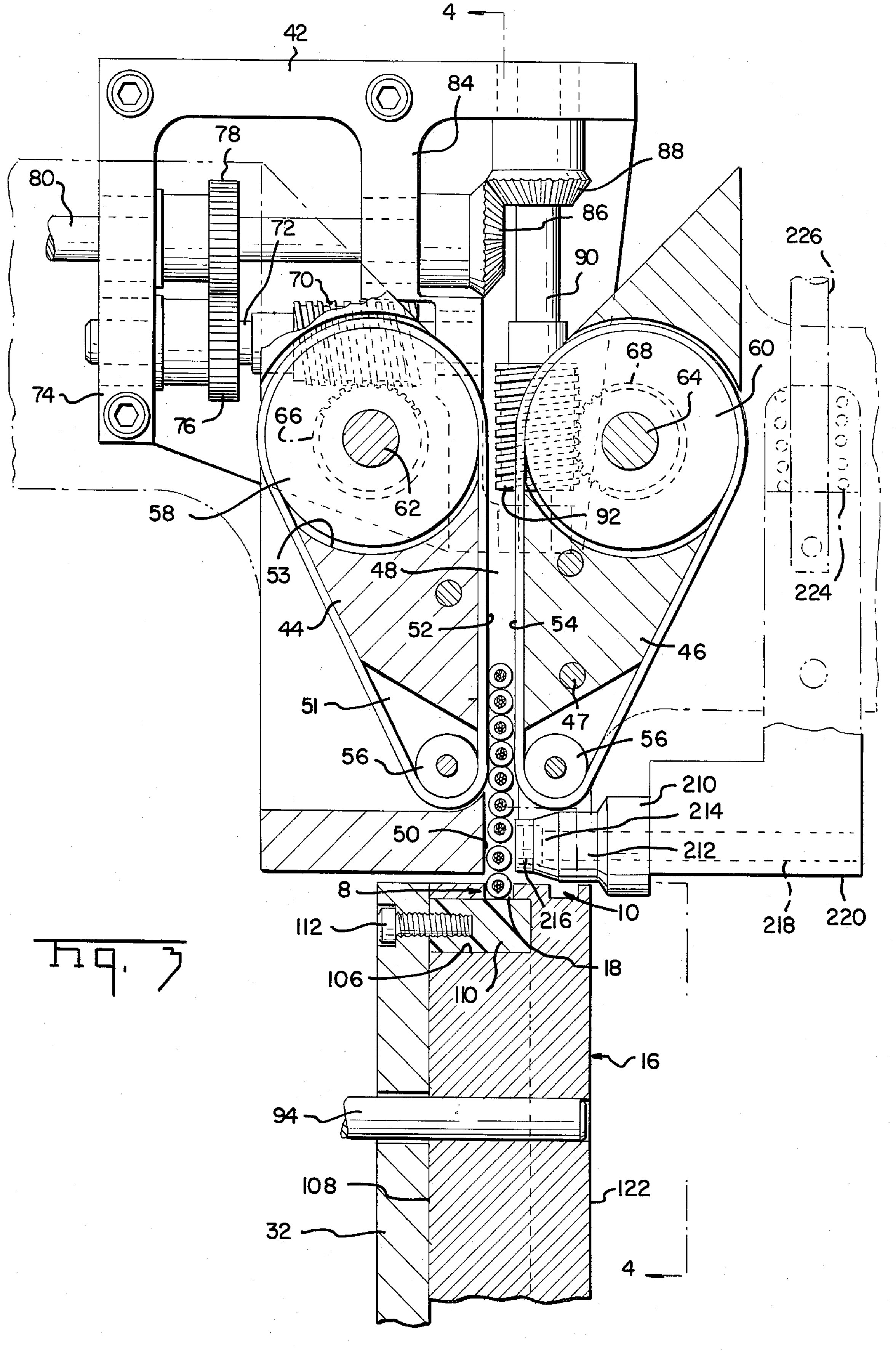
FIG. 3 is a fragmentary frontal view, on an enlarged scale and partially in section, of the central portion of FIG. 2.
Figure 4:
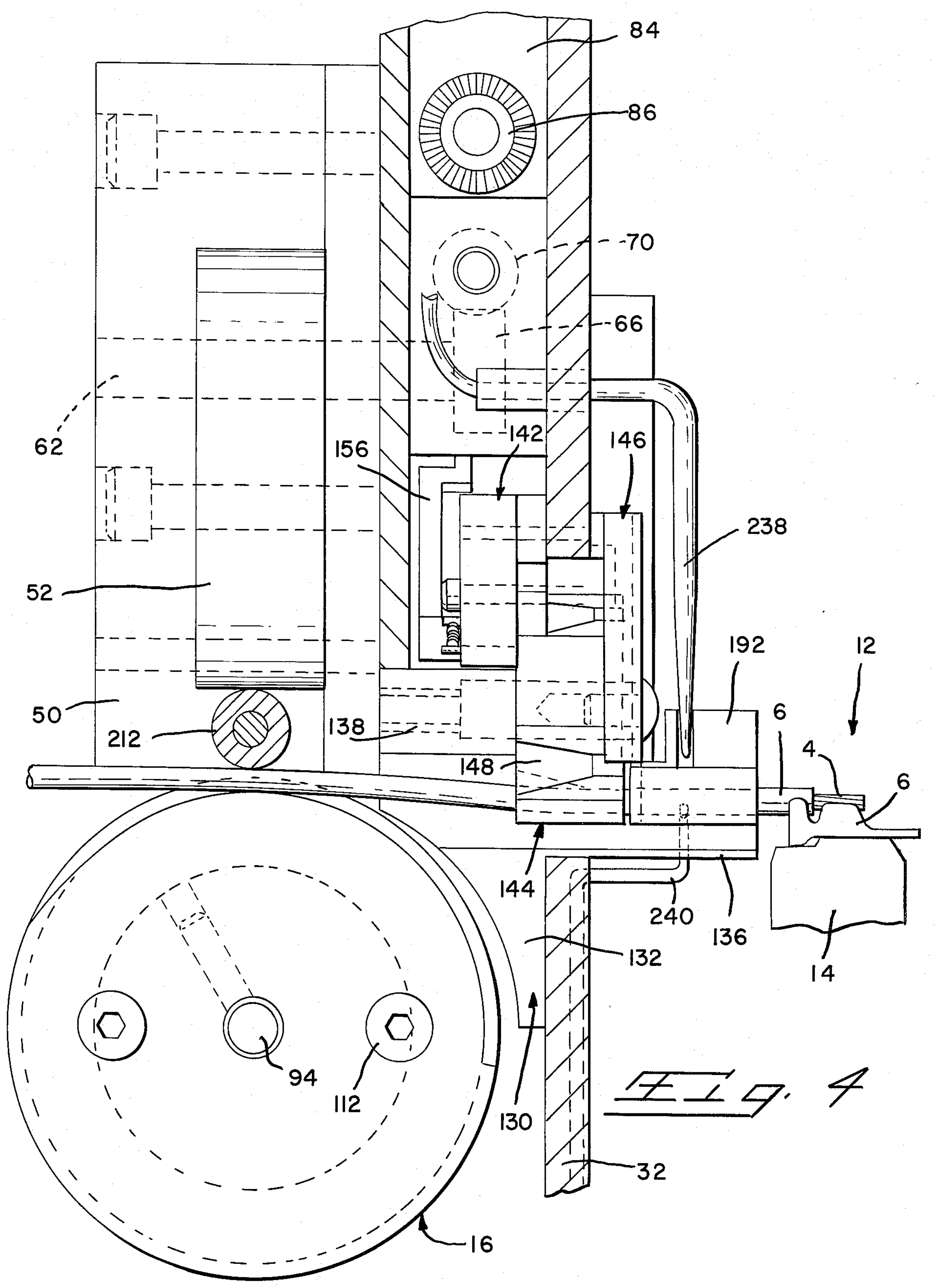
FIG. 4 is a view taken along the line 4—4 of FIG. 3.

The essential motions which are imparted to the wires by the apparatus are shown in FIGS. 2–4, the operator stacks the wires in a slot 48 at a loading station 8 (FIG. 3) and the wires are individually removed from the bottom of the stack and conveyed laterally to a wire feeding station 10. The lateral conveyance and axial feeding of each wire is carried out by a cylindrical conveying and feeding drum 16 which rotates continuously during operation. The wire is fed axially at the feeding station 10 to an operating zone 12 (FIG. 4) and the stripped end 4 is located in alignment with the terminal which is disposed on an anvil 14. Finally, the terminal is crimped onto the wire by a crimping die 15 (FIG. 5) and the terminated wire is ejected from the apparatus.

Referring now to FIG. 1, the apparatus comprises a conventional bench press 20 mounted on a suitable support surface 22 and having a terminal applicator (not specifically shown) mounted on its platen. The ram of the terminal applicator is connected to the press ram and the crimping die 15 is mounted on the applicator ram. Terminals in strip form 24 are fed from a reel over a guide plate 26 to the applicator to position the leading terminal of this strip on the anvil as shown in FIG. 4 in accordance with conventional practice.

A housing 28 for the control circuitry and the motors of the apparatus is also supported on the support 22 and this housing has sidewalls and internal walls as shown at 32, 34, 35 on which various parts of the apparatus are mounted and supported as will be described below. The upper surface 30 of the housing 28 serves as a work surface for the operator and as a support for wires which are being serially fed into the machine by the operator. Advantageously the casing 28 is provided with adjusting means 36 so that it can be raised and lowered relative to the surface 22 and the press 20 can similiarly be adjusted so that the conveyed and fed wires will be properly positioned above the anvil 14 after the wires are axially fed.

The casing backwall 32 (FIG. 2) extends upwardly and rightwardly as viewed in FIG. 2 and as shown at 38. A spacer member 40 is secured against the face of the plate section 38 and a cover plate 42 is secured by fasteners as shown to this spacer. The loading means for loading wires onto the drum 16 is mounted on the cover plate 42 and drive shafts and other parts of the apparatus are supported on the plate section 38 and the cover plate.

The loading station 8 comprises left and right hand block assemblies 44, 46 mounted on the plate 42 which are spaced apart to define the vertically extending guide slot 48 for the wires as shown in FIG. 3. While the wires may fall downwardly in this slot under gravitational forces, it is desirable to provide endless belts 52, 54 which are continuously driven downwardly as viewed in FIG. 3 to ensure that a jammed wire does not impede the downward movement of the wires to the conveying and feeding drum 16. These belts also serve to compact the wires in the slot and thereby ensure that a wire will enter the conveying drum or wheel 16 as will be described below. Belt 52 on block 44 extends over a drive pully 58, downwardly on the left hand side of the slot, over an idler pully 56 in the lower portion of the block 44 and back to the drive pully 58. Drive pully 58 is secured, as by keying, to a shaft 62 which extends rearwardly through the cover plate 42 to the plate section 38. Shaft 62 has a gear 66 thereon which meshes with a worm gear 70 on a horizontally extending shaft 72 which extends leftwardly as viewed in FIG. 3 and has its end journaled in an arm 74 of the spacer member 42. Shaft 70 has a spur gear 76 thereon which meshes with another spur gear 78 mounted on a main drive shaft 80. The drive pully and the idler 56 are disposed in suitable recess in the block 44 as shown at 51 and 53.

The right hand block 46 has a drive pully 60 therein mounted on a shaft 64 which drives the belt 54 downwardly, around an idler 56 and back to the pully 60. The shaft 64 on which the pulley 60 is mounted has a spur gear 68 mounted thereon which meshes with the worm gear 92 on a vertically extending jack shaft 90 which is journaled at its upper end in the spacer member 42. A bevel gear 88 on shaft 90 meshes with a bevel gear 86 on the previously mentioned horizontally extending main power shaft 80. The main power shaft is driven by a suitable fractional horsepower motor to which it is coupled through bevel gears by a vertically extending shaft 82 (FIG. 2). It will be apparent from an inspection of FIG. 3 that during continuous rotation of the shaft 80, the pullies 58, 60 will be driven continuously and the portions of the belts 52, 54 which are on each side of the slot 48 will move downwardly continuously.

The wire loading slot 48 extends through the lower portion of the block 44 as shown at 50 and clearance is provided on the right hand side of the slot 48 at its lower end to permit the wires to move downwardly so that the lowermost wire will be properly located and fall into a groove 18 in the surface of the drum 16 which will be described below. It should be noted at this point that the upper ends of the blocks 44, 46 have divergent surfaces so that the operator can load wires into the slot 48 by merely placing them between the blocks and against one of these surfaces. The belts will then ensure that the wires will move downwardly and form the stack shown in FIG. 3.

Advantageously, the block 44 is adjustably mounted for horizontal movement towards and away from the block 46 so that the width of the slot 48 which receives the wires can be adjusted. In the disclosed embodiment the block 44 is mounted on a mounting plate 55 which is secured by a bolt 57 to the plate 42. The bolt extends through an elongated slot in the plate 55 so that the mounting plate and the block 44 can be moved rightwardly and leftwardly for adjustment purposes as viewed in FIG. 2. An adjusting screw 59 may be provided to permit precise positioning of the mounting plate.

The block 46 is provided with a cover plate 61 and the lower end of this block is recessed to provide clearance for a pressure roll 210 described below.

The feed drum 16 is mounted on a shaft 94 which extends between two parallel fixed plates 32, 35 which form portions of the housing. A gear 98 (FIG. 2) is secured to the shaft 94 between the plates 32, 35 and this gear meshes with a gear 100 on the output shaft 102 of a stepping motor 104.

As shown best in FIG. 3, a circumferential recess 106 extends concentrically into the side 108 of the feed drum 16 which is against the rightwardly facing surface of the plate 32. This recess receives a ring 110 of plastic or other low friction material and the ring in turn is secured to the surface of the plate 32 by suitable fasteners 112. The feed wheel 16 thus rotates on the fixed ring 110.

As shown best in FIG. 9, the groove 18 in the surface 114 of the feed drum is formed in part by a slot 116 which extends through the surface and communicates with the circumferential recess 106. This portion of the groove has an end 120 and extends for a substantial distance along a straight line as seen in the developed view, FIG. 9, of the surface 114. The groove extends from this straight portion towards the right hand side 122 of the feed drum 16 and merges with this right hand side of the drum as shown at 123.

The purpose of the fixed ring 110 is illustrated in FIGS. 10 and 11; the ring extends inwardly beneath portions of the groove 18 in which wires are conveyed laterally towards the side 122 of the feed drum. During such lateral conveyance of the wires, it is desirable to avoid the imposition of an axial feeding force component on the wires and the imposition of such an axial feeding component is minimized by virtue of the fact that the inner surface 126 of the groove is stationary and the coefficient of friction between the wire and this stationary surface is low. The portion of the groove 18 shown at 118 in which the wire is fed axially lies in the solid portion of the drum, that is rightwardly of the recess 106 as viewed in FIG. 3 so that the inner end 127 of this portion of the groove imparts an axial force component to the wire tending to feed it towards the operating zone of the apparatus. Advantageously, this surface 127 of the groove is roughened or otherwise treated to produce a high frictional coefficient. As will be explained below, a wire being fed is resiliently urged against the surface 127 by a pressure roll 210.

Figure 5:
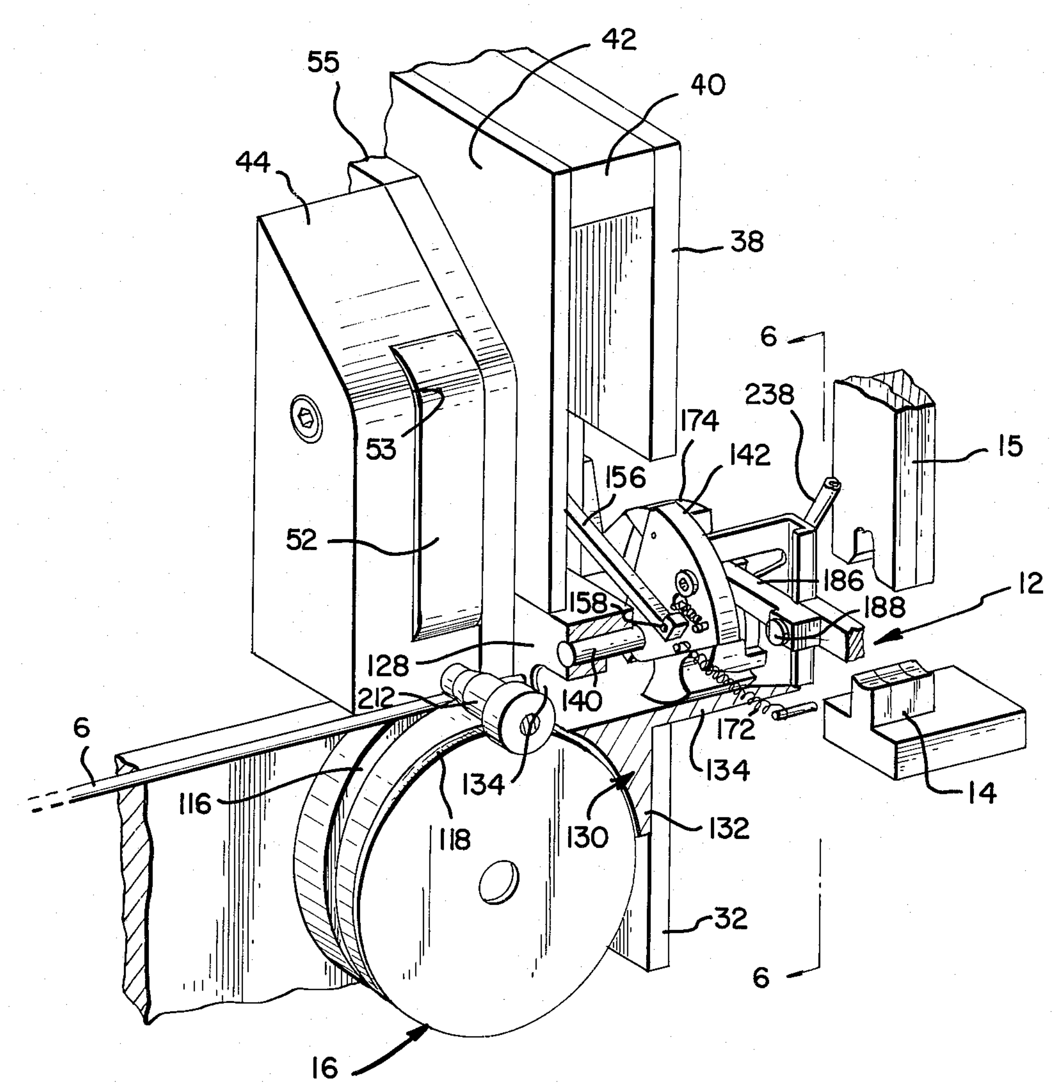
FIG. 5 is a fragmentary perspective view, with parts removed and broken away in places, looking from the right in FIG. 2, this view showing the wire conveying and feeding drum and portions of the operating zone of the apparatus.
Figure 8:
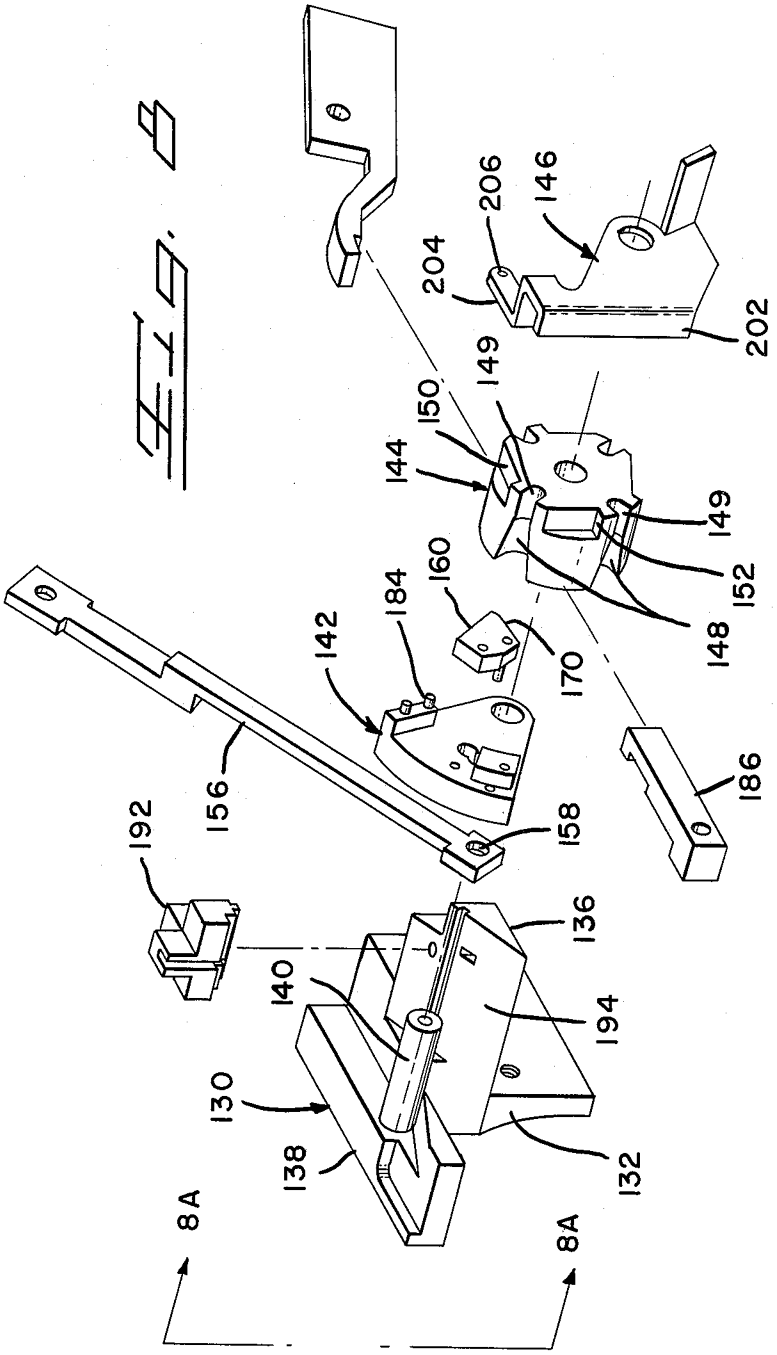
FIG. 8 is an exploded perspective view of the ejector wheel, the indexing means for the ejector wheel, and other associated structural features or elements.
Figure 8A:
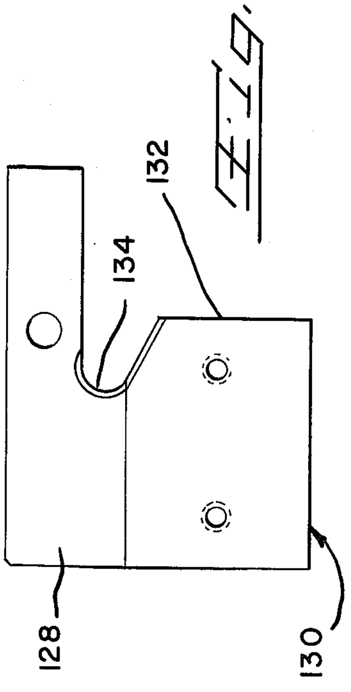
FIG. 8A is a frontal view of the block 130, looking in the direction of the arrows 8A—8A of FIG. 8.
Figure 12:
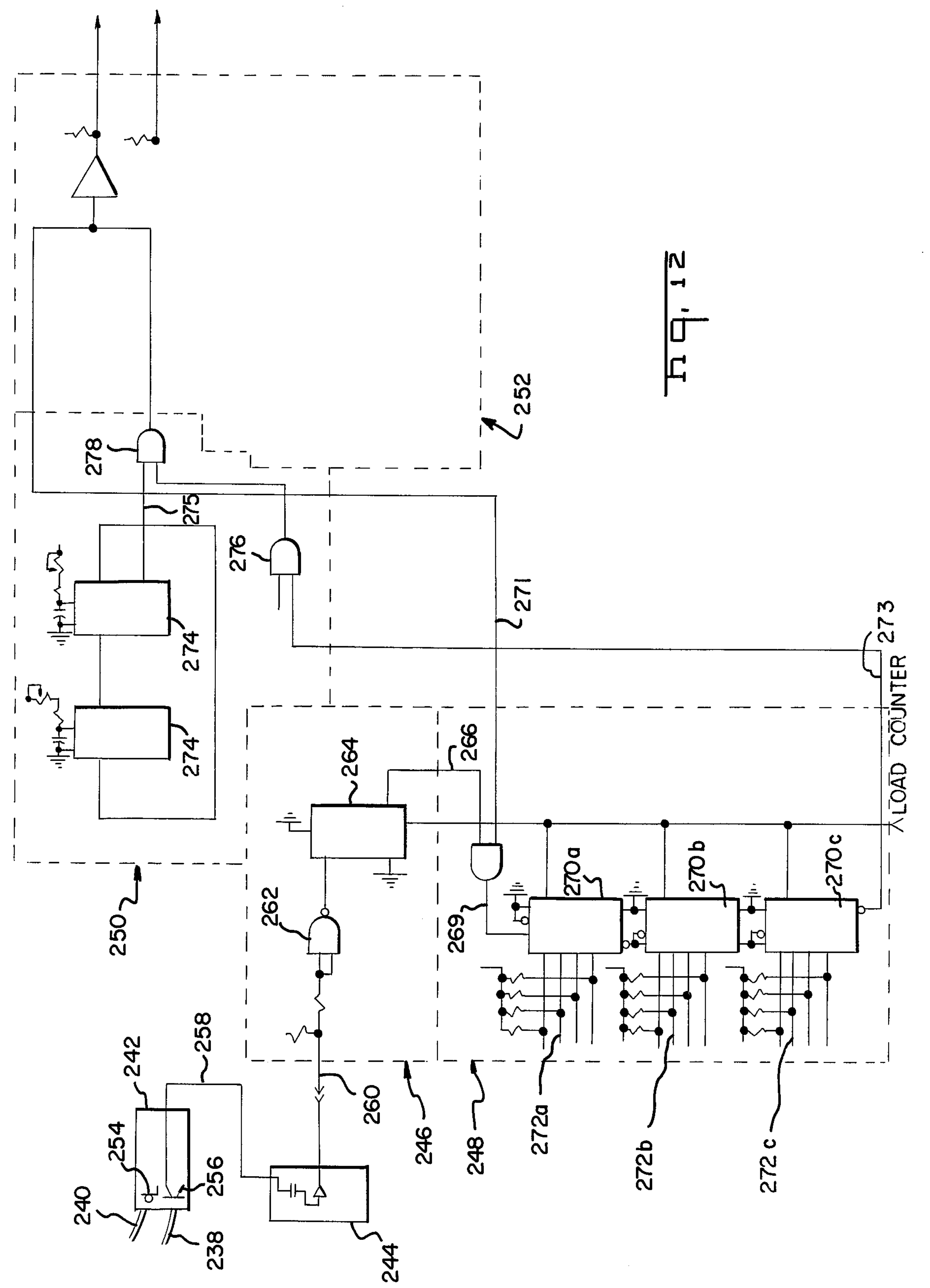
FIG. 12 is a diagram of the control means and circuitry for controlling the operation of the apparatus.

While the wires are being laterally conveyed from the loading station 8 to the axial feeding station 10, their leading ends bear against a surface 128 of an irregularly shaped block 130 (FIGS. 4, 5, and 8) which is mounted in a recess or notch in the plate 32 and which has portions adjacent to the feed wheel and the plate 32. This block 130 thus has a depending portion 132, a recess 134 which extends into the block from the right hand side thereof as viewed in FIG. 8A through which the wires are fed, and a rearwardly projecting section 136 which extends towards the crimping die and anvil 14, 15 as shown in FIGS. 5 and 8. It will be apparent that the surface 128 in cooperation with the roller 210 serves as a confining means which confines the wires being conveyed laterally of their axes until they are fed axially by the pressure roller.

A pin 140 is mounted in the upper section 138 of the block 130 and extends parallel to the direction of wire feed towards the operating zone 12. This pin has mounted thereon an actuator sector 142, indexable ejector wheel 144 and a wire retainer plate 146. The sector, the ejector wheel, and the wire retainer serve to control a wire being fed towards the operating zone and to cause the ejection of a wire to which a terminal has been crimped as will be explained below.

Figure 6:
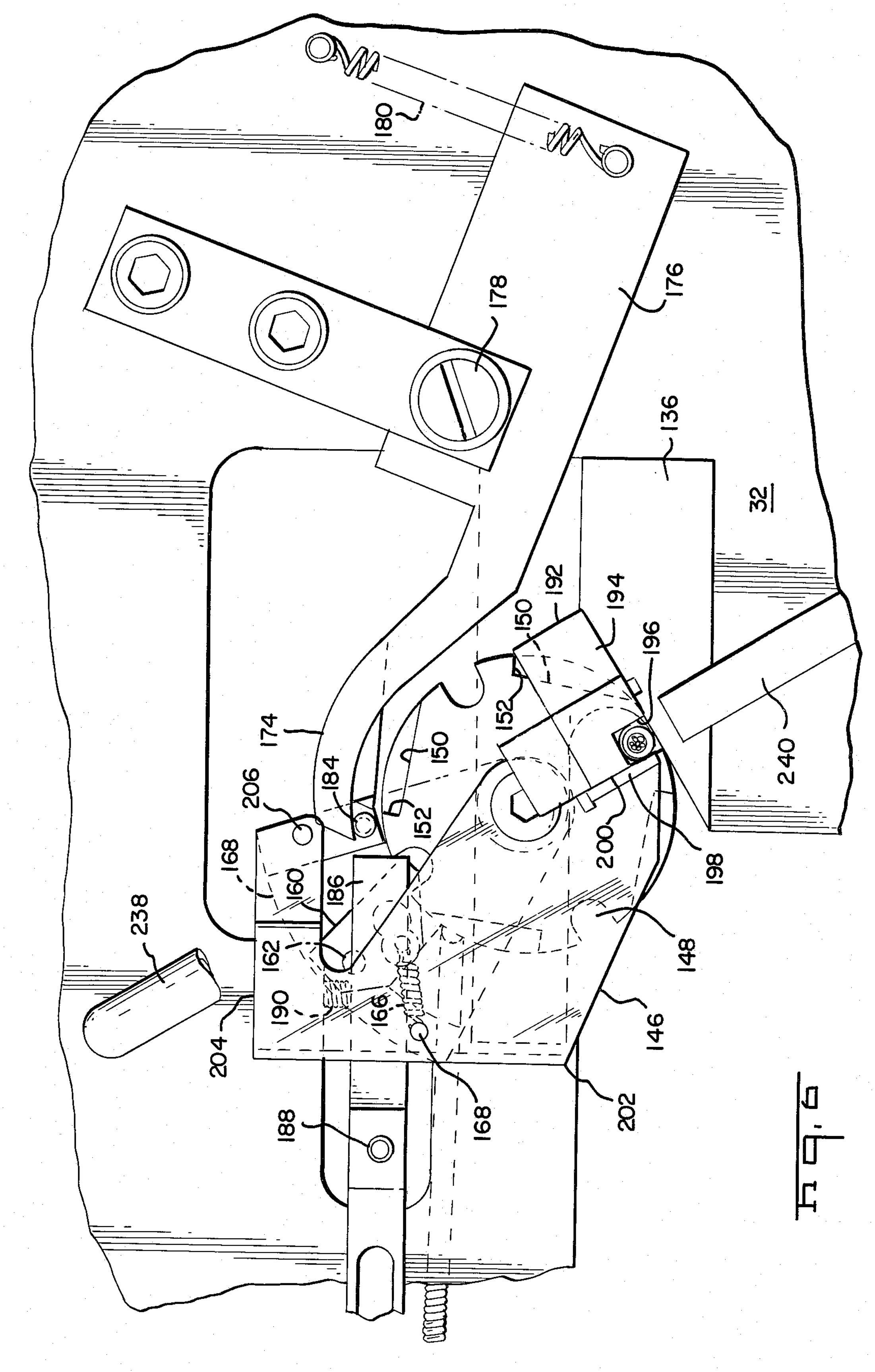
FIG. 6 is a view taken along the lines 6—6 of FIG. 5 showing particularly the ejection wheel for the wires and the means for indexing this ejector wheel, this view showing the normal positions of the parts.
Figure 7:
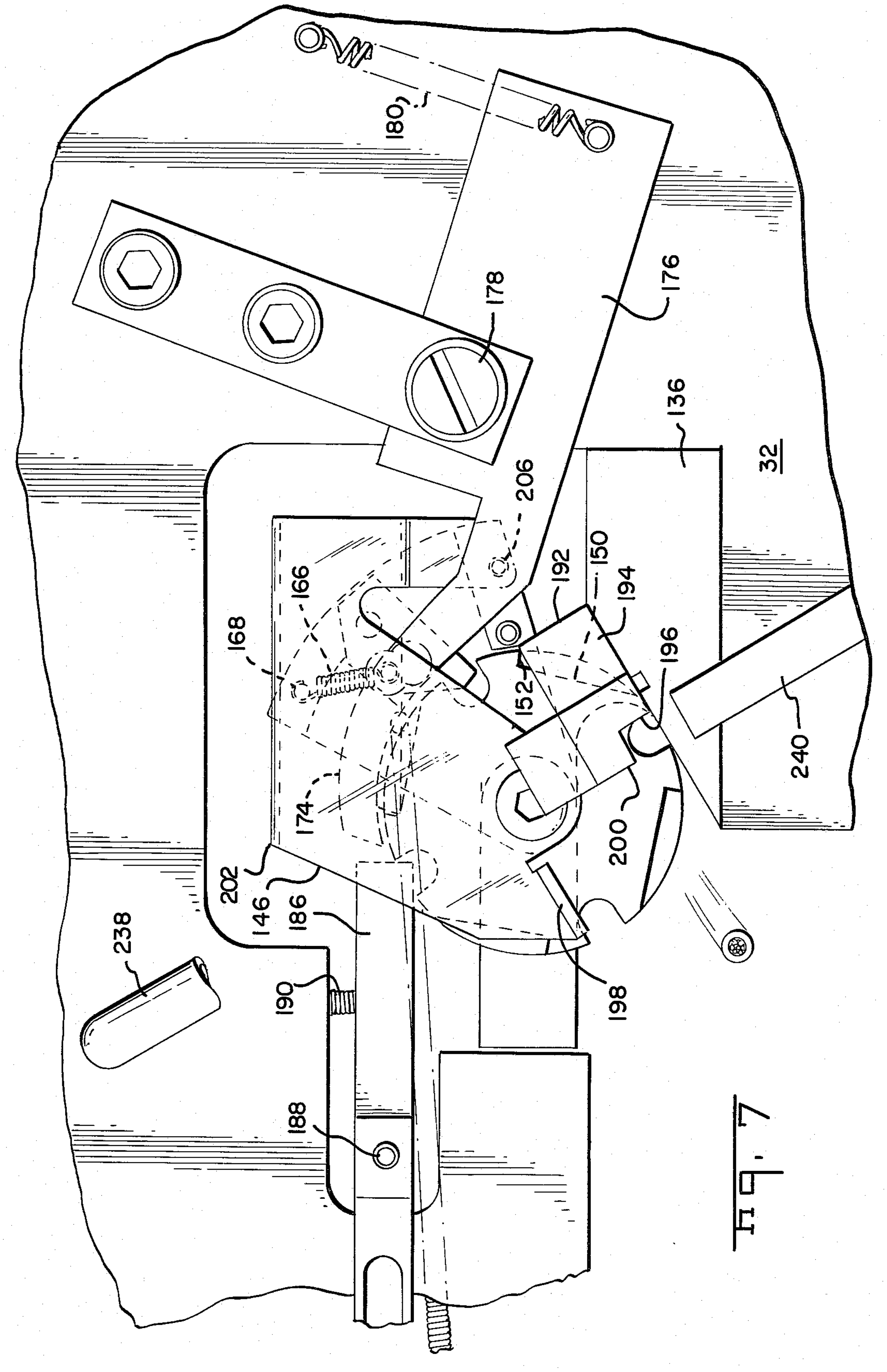
FIG. 7 is a view similar to FIG. 6 but showing the positions of the parts at a time close to the end of the operating cycle at which a terminated wire is ejected from the apparatus.

The indexable ejector wheel 144 is mounted between the sector 142 and the plate 146 and has four funnel-like recesses 148 extending axially through its surface at 90 degree intervals. Each recess 148 converges in the direction of wire feed and has a uniform diameter section 149 adjacent to the right hand end of the wheel as viewed in FIG. 4. The recess opens onto the cylindrical surface of the wheel to permit the wires to be ejected laterally of their axis during indexing the wheel as shown in FIGS. 6 and 7. Notches 150 are provided in the surface of the wheel between the recess 148 and each notch has a shoulder 152 which faces in a clockwise direction relative to the axis of the wheel as viewed in FIG. 6.

The wheel 144 and the wire retainer plate 146 are indexed during each operating cycle by the sector 142 which is oscillated relative to the axis of the pin 140 by a solenoid 4 (FIG. 2) which has an actuating member (not specifically shown) that is connected to the sector by a connecting rod 156 at a pivotal connection 158. The rearwardly facing surface of the sector, the surface which is against ejector wheel 144, has mounted thereon a pawl 160 by means of a pivotal connection 162 adjacent to the outer end of the sector. The pawl is resiliently biased in a clockwise direction as viewed in FIG. 6 by a spring 166 which is connected at one end thereof to a pin 167 which extends through an oversized slot in the sector. The other end of spring 166 is connected to a pin 168 mounted in the sector. The end of the pawl is contoured as shown at 170 such that it will enter the recesses 148 in the wheel and, during clockwise movement of the sector as viewed in FIG. 3, it will cause the wheel to be indexed in a clockwise direction. The end of the pawl is also designed such that it can move in a counterclockwise direction without effecting the wheel.

In order precisely to control the wheel 144, stops are provided to prevent overfeeding of the wheel and to prevent reverse motion of the wheel after it has been indexed. The anti-overfeed stop (FIG. 6) comprises an arcuate arm 174 on one end of a lever 176 which is pivoted intermediate its ends at 178 to the frame plate 32. Lever 176 is biased in a counterclockwise direction as viewed in FIG. 6 by a spring 180 which is secured by means of a pin to the right hand end of the lever and which is secured to its other end to a pin which is anchored in the plate 32. The arm 174 has a tooth 182 extending from its side which is adjacent to the surface of the wheel 144. This tooth is dimensioned to enter the notches 150 in the wheel and bear against the shoulders 152.

The sector 142 has a pin 184 extending towards the indexing wheel and this pin bears against the side of the arm 174 which is adjacent to the surface of the wheel 144. When the parts are at rest, that is, when they are in the positions of FIG. 6, the pin 184 maintains the arm 174 in the position of FIG. 6 in which it is spaced from the indexing wheel. As the sector moves through its clockwise arc from the position of FIG. 6 to the position of FIG. 7, the pin 184 moves out of engagement with the arm 174 so that the tooth moves into the notch 150 which is proximate to the end of the arm as shown in FIG. 7. The shoulder 152 moves against the tooth and the wheel 144 is thus stopped from further rotary movement at a precisely predetermined position. When the sector 142 then moves through a counterclockwise arc to its normal position (FIG. 6) it raises the arm 174 and disengages the tooth from the notch 150.

Counterclockwise movement of the wheel 144 is prevented by a stop on the end of an arm 186 which is pivotally mounted at 188 on the left hand side of the indexing wheel as viewed in FIG. 6. Arm 186 is biased in a clockwise direction by a spring 190 and the end of the arm is dimensioned to enter the recesses 148 as shown in FIG. 6 such that counterclockwise movement of the indexing wheel is prevented while clockwise movement of the indexing wheel can take place with accompanying deflection of arm 186.

As shown in FIGS. 4, 6, and 8 the rightwardly extending portion 136 of the block 134 has an inclined surface 194 which extends generally tangentially with respect to the indexing wheel so that the surface of the wheel is close to the inclined surface of the block. An L-shaped guide block 192 is secured to a suitable fastener to the inclined surface 194 and the corner of this block is provided with a notch 196 (FIG. 6) which is in alignment with the axis of the recess 148 which is adjacent to the inclined surface. A passageway for a wire being fed is defined by this notch and by a retaining arm 198 which extends forwardly, that is towards the operating zone, from the previously identified wire retainer plate 146. Plate 146 is mounted on the pin 140 and against the end of the indexing wheel. The arm 198 is disposed against the open side of the notch 196 when the plate 146 is in the position of FIG. 6. The plate 146 has a flange 202 extending from the outer end and an arm 204 extends rightwardly from upper end of the plate as viewed in FIG. 6. The end of this arm is pivotally connected at 206 to the sector 142 so that when the sector is oscillated as previously described, the plate 146 and, therefore, the arm 198 moves with the sector.

As will be apparent from a comparison of FIGS. 6 and 7, after a terminal has been crimped onto wire in the operating zone, the indexing wheel is indexed through an angle of 90 degrees and after the recess in which the wire is held moves away from the inclined surface 194 the terminated wire is free to fall from the indexing wheel as shown in FIG. 7.

As mentioned above, during the wire feeding step, the wire in the groove 18 at the feeding station is resiliently urged against the inner end of the groove in order to impart an axial feeding force to the wire. To this end, a pressure wheel 210 (FIG. 3) is provided immediately above the upper end of the drum 16 at the wire feeding station. This pressure wheel is mounted on a shaft 218 which extends parallel to the shaft 94 and it has an intermediate cylindrical portion 212 which is adapted to engage the wire being fed. This intermediate cylindrical portion merges with a conical surface 214 which in turn merges with a cylindrical portion 216 of reduced diameter. By virtue of the reduced diameter portion and the cylindrical and conical portion 214, the wires can be conveyed rightwardly until they are in the right hand portion of the groove 18 and beneath the cylindrical feed portion 212 of the idler roll.

The shaft 218 on which roll 219 is mounted is carried in the lower end of an L-shaped block 220 which is slidably contained in a housing 222 that is mounted on the plate 42. A rod 226 extends upwardly from the block 220 and a spring 224 surrounds the rod and biases the block downwardly. The normal position of the block 220 is such that the roll 210 is in feeding relationship to a wire in the groove 18. During intervals when wires are not being fed, the rod 226 is moved upwardly against the biasing force of the spring 224 to disengage the roll from the wire. Upward movement of the rod 226 is brought about by a solenoid 234 which is mounted on the plate 32 and which has an actuator rod extending therefrom coupled to the right hand end as viewed in FIG. 2 of a lever 228. The left hand end of this lever has a lost motion pin-slot connection 227 with the upper end of the rod 226 and the lever is pivotally mounted on the plate 42 intermediate its ends as shown at 230. It will thus be apparent that upon energizing the solenoid 234, the rod 226 will be moved upwardly to disengage the feed roll or to move the feed roll to its non-feeding position.

It will be apparent that the axial feeding of the individual wires into the operating zone must be precisely controlled so that the ends of the wires will be properly located between the die and anvil and in alignment with the terminal disposed on the anvil. Such precise feeding of the wire is accomplished by a control system for the stepping motor 104 which causes this motor to rotate through a precisely determined arc after the wire passes a predetermined position during the wire feeding step. Specifically, as the wire moves through the block 192, it interrupts a beam of light which extends between the ends of two fiber-optic conductors 238, 240. The upper conductor 238 extends into the block 192 and is in alignment with the lower conductor 240 as shown best in FIG. 4. The light beam transmitted by these conductors intersects the path of wire feed and when this light beam is interrupted by a wire being fed, the stepping motor is rotated through a precisely determined arc to feed the wire by the distance which separates the axis of the fiber-optic conductors and the terminal which is positioned on the anvil. This control system for the stepping motor is described below.

The stepping motor control system comprises an emmitter/sensor block 242, an amplifier 244, a wire sense latch and counter enable 246, a counter 248, a clock 250, and a motor control board interface 252 which is connected to the control board for the motor. The control board and the stepping motor may be of any suitable commercially available model, for example, good results have been obtained using a Superior Electric MO63-FC06 stepping motor in combination with a Superior Electric control board model STM1800D. This control board and motor are available from Superior Electrical Company of Bristol, Connecticut.

The emmitter/sensor block 242 serves to sense the absence of, or the partial interruption of, the light transmitted through the fiber-optic conductors 238, 240. The interruption takes place when the leading end of a wire passes between these two conductors as illustrated in FIG. 4. This sensor block 242 thus comprises an incandescent light source 254 from which the light transmitted through the conductor eminates and a photo transistor 256 which responds to the interruption of the light source and sends forth a signal through a line 258 to the amplifier 244. The emmitter/sensor block may be, for example, a Scan-A-Matic model SO1116.

The amplifier 244 is of the AC-coupled type and amplifies the pulse from the emmitter/sensor block 242 before it passes through a line 260 to the sense latch and counter enable 246. This sense latch comprises a Schmitt trigger 262 which may be an RCA part number CD4093 and which serves to shape the pulse before it is transmitted to a clock D-type flip-flop 264 which stores the pulse during the interval of measuring the wire feed, that is, while the wire is being fed from a location between the fiber-optic conductors to its final positions as shown in FIG. 4. The flip-flop may be of a type manufactured by the Radio Corporation of America and sold commercially as part number CD4013.

The flip-flop 264 is connected by a line 266 to an AND gate 268 which serves as an enabling means to cause the motor driving circuitry to begin the wire measuring counts as described below. The AND gate 268 is connected as shown by 269 to cascaded counters 270*a*, 270*b*, 270*c* which can be set for a given number of counts by thumbwheel switches 272*a*, 272*b*, and 272*c* respectively. The counters may be of the type sold by Radio Corporation of America part number CD4029. The AND gate 268 is connected as shown in 271 to the unbuffered clock output which in turn controls the continuous operation of the motor. The counter 270*c* is connected as shown at 273 to AND gates 276, 278, and gate 278 also being connected as shown at 275 to the clock 250. The clock 250 serves to supply pulses to the Superior Electric motor control board model STM 1800D (not shown) and comprises two multi-vibrator circuits 274 which form an astable multi-vibrator.

When the counter zero signal is transmitted through 273 to the AND gate 276 and the AND gate 278, the clock output ceases and the motor stops. The output from the gate 278 is fed to a CMOS-to-high-current driver 280 which may be of the type sold by Sprague part number ULN2004. The multi-vibrator circuits 274 may be of the type sold by RCA, part number CD4098 and the AND gates 276, 278 may be of the type sold by RCA part number CD4081.

To summarize, when the light transmitted through the fiber-optic connector 238, 240 is interrupted by the leading end of a wire, the emmitter/sensor block 242 in combination with the amplifier 244 provides a pulse through line 260 to the wire sense latch 246. Upon receipt of this pulse the counter is enabled and the wire measuring sequence is started. The motor rotates by an amount determined in the setting of the thumb-wheel switches *272a–272c* and when the counters are fully decremented, a zero signal is transmitted to the gates 276, 278 which has the effect of stopping the clock and, therefore, stopping the motor.

The zero signal functions as a start signal to the other circuitry which controls the functions of crimping the terminal on the wire, feeding the terminal, and ejecting the terminated lead. This circuitry then sends the load counters signal back to the motor control system which restarts the stepping motor.

The disclosed control system has the advantage of being extremely sensitive to the wire when the leading end of the wire interrupts the light beam which extends between the adjacent ends of the fiber-optic conductors 238, 240 in the block 192. Advantageously, these conductors comprise bundles of glass fibers which are bunched to form a cable having a rectangular cross section, the dimensions of this cross section being about 0.125 inches by 0.010 inches. If the leading end of the wire interrupts as little as 25 percent of the light beam transmitted between the ends of these conductors, the disturbance will be sufficient to cause a signal to be sent through the line 258 to the amplifier 244 and, thereby, start the wire measuring sequence.

It will be apparent from the foregoing description that during continuous operation of the apparatus, the operator simply stacks stripped leads 6 in the vertical slot 48 and the machine transports the leads from the slot to the crimping station and ejects them into a suitable retaining bin formed in the cover as shown in FIG. 1. The operation of stacking the leads in the slot does not require a high degree of skill and does not require precise location of the wires since the upper ends of the blocks are provided with inclined surfaces to guide the wires into the slot. The machine can operate easily at speeds in excess of three thousand leads per hour and an operator has no difficulty in placing wires in the slot at a rate sufficient to keep the conveyer supplied with wires.

While the disclosed embodiment of the invention is adapted to crimp an open barrel type terminal into the ends of the wires, it will be apparent that the apparatus can be used effectively to crimp closed barrel terminals into wires since the wires are moved axially and precisely at the feeding station into the crimping zone. The crimping die and anvil must be arranged to support a closed barrel terminal and the feeding mechanism set to feed the wire by an amount such that at the conclusion of the feeding step, the stripped end of the wire is disposed in the barrel of the terminal.

It should be noted that the feed control system described above can be used for other types of wire processing machines and additionally that alternative feeding systems or feed control systems might be used in accordance with the practice of the instant invention.

What is claimed is:

1. In an apparatus for conveying wires serially laterally of their axes for a predetermined distance and then feeding each wire axially, said apparatus comprising, a wire conveying and feeding drum having a cylindrical surface, drive motor means for rotating said drum, a wire receiving groove in said cylindrical surface, said groove extending circumferentially around said drum and towards one end of said drum, confining means extending adjacent to said surface and towards said one end of said drum for confining said wires in said groove, and pressure roller means adjacent to said one end of said drum for applying pressure to a wire disposed in said groove at a location adjacent to said one end, the improvement comprising:

a concentric circumferential recess extending into said drum from the end which is opposite to said one end, said recess extending towards said one end, a fixed member in said recess, first portions of said groove being formed by a slot in said drum which extends from said cylindrical surface to said recess whereby said first portions of said groove have an inner end which is formed by the surface of said support member whereby, upon placing a wire in said groove while said drum is rotating, said wire will be conveyed laterally of its axis and towards said one end, and after lateral conveyance, said wire will be fed axially by said drum in cooperation with said pressure roller.

2. Apparatus as set forth in claim 1, said apparatus having a wire loading station for loading wires into said groove, said loading station comprising guide slot means extending towards said drum and transversely of the axis of said drum, said guide slot means having opposed surfaces which are spaced apart by a distance which is sufficient to receive one of said wires whereby said wires can be stacked in said guide slot means and the lowermost wire of the stack will enter said groove during each rotation of said drum, endless belt means extending along said opposed surfaces of said guide slot means, and means for moving said bolt means continuously towards said drum whereby wires stacked in said guide slot means are urged towards said cylindrical surface of said drum.

3. Apparatus as set forth in claim 1, said recess extending only partially through said drum whereby second portions of said groove have an inner end which is in said drum, and wires disposed in said second portions of said groove are fed axially by said drum in cooperation with said pressure roller means.

4. In a wire conveying and feeding drum of the type used in an apparatus for conveying wires laterally of their axes and then feeding each wire axially, said drum having a cylindrical surface and a wire-receiving groove extending circumferentially around said drum and towards one end of said drum, the improvement comprising:

a concentric circumferential recess extending into said drum from the end which is opposite to said one end, a fixed support member in said recess, first portions of said groove being formed by a slot in said drum which extends from said cylindrical surface to said recess so that said first portions of said groove have an inner end which is formed by the surface of said support member whereby, upon placement of a wire in said groove during rotation of said drum, said wire will be conveyed laterally of its axis towards said one end of said drum without the development of a significant axial force component on said wire by virtue of the fact that said wire is supported on said surface of said fixed support member.

5. A wire conveying and feeding drum as set forth in claim 4 in combination with a wire loading means for loading wires into said groove, said loading station comprising guide slot means extending towards said drum and transversely of the axis of said drum, said guide slot means having opposed surfaces which are spaced apart by a distance which is sufficient to receive one of said wires whereby said wires can be stacked in said guide slot means and the lowermost wire of the stack will enter said groove during each rotation of said drum, endless belt means extending along said opposed surfaces of said guide slot means, and means for moving said belt means continuously towards said drum whereby wires stacked in said guide slot means are urged towards said cylindrical surface of said drum.

* * * * *